United States Patent [19]
Deaver et al.

[11] Patent Number: 5,345,484
[45] Date of Patent: Sep. 6, 1994

[54] FEEDWATER NOZZLE AND METHOD OF REPAIR

[75] Inventors: Gerald A. Deaver; Siamak Bourbour, both of San Jose, Calif.

[73] Assignee: General Electric Company, San Jose, Calif.

[21] Appl. No.: 56,083

[22] Filed: May 3, 1993

[51] Int. Cl.$^5$ .............................................. G21C 15/00
[52] U.S. Cl. ................................... 376/407; 376/204
[58] Field of Search ............... 376/286, 352, 204, 203, 376/451, 407; 976/DIG. 171; 138/99; 137/373; 261/DIG. 39

[56] References Cited

U.S. PATENT DOCUMENTS

| | | | |
|---|---|---|---|
| 4,212,594 | 7/1980 | Sheer, Jr. ............................ | 417/54 |
| 4,247,262 | 1/1981 | Lipstein ............................... | 417/54 |
| 4,285,770 | 8/1981 | Chi et al. ............................ | 376/407 |
| 4,369,893 | 1/1983 | Pennell et al. ..................... | 220/378 |
| 4,834,935 | 5/1989 | Daigle et al. ...................... | 376/292 |
| 4,859,403 | 8/1989 | Dixon et al. ....................... | 376/286 |

OTHER PUBLICATIONS

GE Nuclear Energy, FIG. SIDS-1, single page, undated, unpublished.
General Electric Technical Services Company, Inc., "Proposal to Bernische Kernkraftwerk Muehleberg for KKM Feedwater Nozzle Monitoring and Evaluation," Jun. 1992, pp.: Cover, i, ii, 1-7, and FIG. 1, unpublished.
GETSCO and DKW, "Agreement Concerning the Sale of Services and Equipment for use in Nuclear Power Plant between Bernische Kraftwerke AG and General Electric Technical Services Company, Inc.," Sep. 6, 1977, pp.: Cover, 17-1, 17-2, and 17-3, unpublished.
GE Nuclear Energy, "Bernische Kraftwerk AG (BKW), KKM Feedwater Nozzles Monitoring and/or Permanent Modification Feasibility Study," Mar. 1992, pp.: Cover, i, and FIG. 14, unpublished.

*Primary Examiner*—Donald P. Walsh
*Assistant Examiner*—Meena Chelliah
*Attorney, Agent, or Firm*—J. S. Beulick

[57] ABSTRACT

A nozzle includes a barrel being integral with a vessel and includes a first bore. A safe end is joined at one end to the barrel by a first weld and at an opposite end to an inlet pipe at a second weld. A first thermal sleeve is disposed inside the first bore and has one end disposed in an interference fit with a second bore of the safe end. In order to repair the nozzle for reducing leakage at the interference fit between the first and second bores, a method includes removing a portion of the inlet pipe and the weld at the safe end and installing a replacement extension therefor. The extension includes a tubular body having a first fork at one end joined to the safe end by a replacement weld, and having a distal end joined to the inlet pipe at a third weld. A second fork is disposed concentrically inside the body and is integrally joined at one end with an intermediate portion of the body, and includes a distal end extending toward the safe end. A second thermal sleeve is disposed inside the first thermal sleeve and is joined at one end to the second fork and has an opposite end portion disposed in sealing cooperation with the first thermal sleeve for sealing flow therebetween to the interference fit between the first thermal sleeve and the safe end.

8 Claims, 3 Drawing Sheets

FEEDWATER NOZZLE AND METHOD OF REPAIR

The present invention relates generally to nuclear reactors, and, more specifically, to a method of repairing a feedwater inlet nozzle therein and the resulting feedwater nozzle.

BACKGROUND OF THE INVENTION

A conventional boiling water reactor (BWR) includes a pressure vessel containing a nuclear reactor core submerged therein in water. Disposed above the core is a steam separator assembly having standpipes or risers extending upwardly from the core for channeling thereto a steam/water mixture, with the steam being separated from the water in the separator assembly.

Disposed above the core in the region of the steam separator assembly is a conventional feedwater sparger which typically includes one or more arcuate portions having injector nozzles for injecting into the pressure vessel when desired relatively cold feedwater for maintaining proper water level in the reactor. The feedwater is conventionally channeled to the pressure vessel through one or more feedwater inlet pipes which are typically welded to corresponding feedwater inlet nozzles integrally formed with the pressure vessel and to which are disposed in flow communication the feedwater spargers inside the pressure vessel. Since the feedwater is relatively cold, and the pressure vessel including the feedwater inlet nozzle is relatively hot, a thermal sleeve is provided inside the inlet nozzle for channeling the feedwater from the inlet pipe directly to the feedwater sparger and thereby thermally insulating the feedwater nozzle from the feedwater. In this way, thermal fatigue of the feedwater nozzle itself is minimized for ensuring a suitably long life of the pressure vessel.

Since a typical BWR may operate for twenty or more years for producing steam to power a steam turbine-generator, for example, the thermal sleeve within the feedwater nozzle may develop leaks of the feedwater which can flow around the outer surface of the thermal sleeve and in direct contact with the feedwater nozzle and thereby provide undesirable cooling thereof. The thermal sleeve is typically welded at one end to the feedwater sparger, with its opposite end being inserted through the feedwater nozzle and in an interference fit with a tubular transition piece which is also known as a safe end. The pressure vessel and the integral feedwater nozzle are typically formed of relatively low alloy steel, and the safe end is typically welded to the feedwater nozzle and is formed of a more expensive alloy steel for forming an effective interference fit seal with the distal end of the thermal sleeve. The feedwater inlet pipe is in turn typically welded to the safe end for completing the flow passage for channeling the feedwater through the wall of the pressure vessel. After initial welding of the safe end to the feedwater nozzle, the feedwater nozzle requires post-weld heat treatment for relieving heat-affected-zone residual stresses therein resulting from the welding operation. The resulting assembly including the safe end provides a relatively long lasting joint for channeling the feedwater into the pressure vessel. However, corrosion or erosion, or both, at the interference fit between the thermal sleeve and the safe end after extended operation of the reactor in service, can result in leakage through the interference fit.

In one conventional repair method used prior to the initial commercial operation of the reactor, the safe end is removed and replaced with a new safe end having a stainless steel tubular inlay. The original thermal sleeve is also removed and replaced with a new double piston ring thermal sleeve, also referred to as a triple thermal sleeve. And, the original feedwater sparger, which originally is welded to the original thermal sleeve, must also be removed and replaced with a new feedwater sparger welded to the replacement triple thermal sleeve, which is accomplished outside the reactor vessel on the refueling floor.

In the event a leak develops after initial commercial operation of the reactor, another conventional repair method includes machining away a portion of the inner surface of the existing safe end for providing an interference fit with a replacement thermal sleeve. As in the above method, both the original feedwater sparger and the original thermal sleeve welded thereto must again be removed and replaced with a new feedwater sparger and a similar triple thermal sleeve as described above. This alternate repair method is conducted from inside the reactor pressure vessel with access through the feedwater nozzle.

Since a typical BWR pressure vessel includes several feedwater nozzles, all of which are repaired even if only one is found to be leaking, the cost associated with the repairs is quite substantial. Furthermore, the time required to effect the repairs is considerable, which subjects repair personnel to radiation exposure during the repair procedures.

SUMMARY OF THE INVENTION

A nozzle includes a barrel being integral with a vessel and includes a first bore. A safe end is joined at one end to the barrel by a first weld and at an opposite end to an inlet pipe at a second weld. A first thermal sleeve is disposed inside the first bore and has one end disposed in an interference fit with a second bore of the safe end. In order to repair the nozzle for reducing leakage at the interference fit between the first and second bores, a method includes removing a portion of the inlet pipe and the weld at the safe end and installing a replacement extension therefor. The extension includes a tubular body having a first fork at one end joined to the safe end by a replacement weld, and having a distal end joined to the inlet pipe at a third weld. A second fork is disposed concentrically inside the body and is integrally joined at one end with an intermediate portion of the body, and includes a distal end extending toward the safe end. A second thermal sleeve is disposed inside the first thermal sleeve and is joined at one end to the second fork and has an opposite end portion disposed in sealing cooperation with the first thermal sleeve for sealing flow therebetween to the interference fit between the first thermal sleeve and the safe end.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
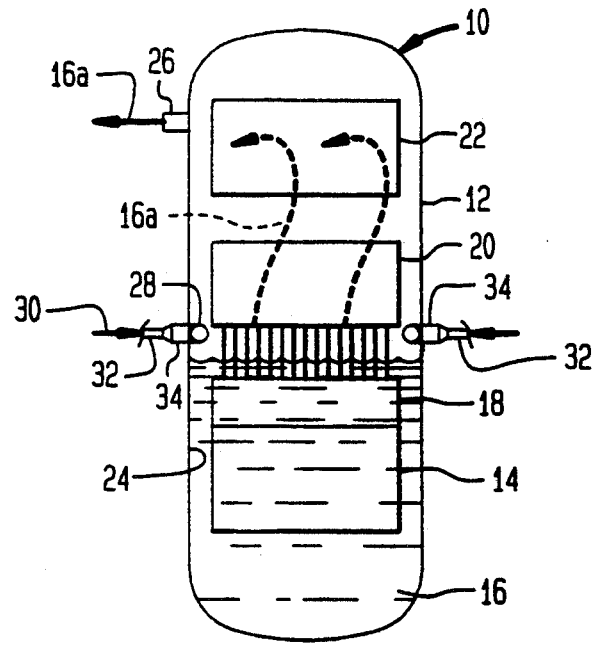
FIG. 1 is an elevation, schematic representation of a conventional boiling water reactor having a pressure vessel and feedwater inlet nozzle repaired in accordance with one embodiment of the present invention.

Illustrated schematically in FIG. 1 is an exemplary boiling water reactor (BWR) 10 having an annular pressure vessel 12 containing therein a conventional nuclear reactor core 14 submerged in reactor water 16. Surrounding the core 14 and extending upwardly therefrom is a conventional annular core shroud 18 having an upper head or dome from which extends upwardly a conventional steam separator assembly 20. Disposed above the steam separator assembly 20 is a conventional steam dryer 22. The core shroud 18 is spaced radially inwardly from the inner surface of the vessel 12 to define an annular downcomer 24 for providing recirculation flow in the vessel 12.

More specifically, during operation of the reactor 10, the reactor water 16 is heated within the core 14 for generating steam 16a which rises upwardly into the steam separator assembly 20 wherein the steam 16a is separated from a majority of the water mixed therewith, with the steam 16a then flowing upwardly into the steam dryer 22 wherein additional moisture is removed therefrom prior to being discharged from the vessel 12 through a conventional main outlet nozzle 26.

Conventionally fixedly joined inside the pressure vessel 12 at an elevation above the core 14 are four or more conventional feedwater spargers 28, each of which includes conventional injector nozzles (not shown) for suitably injecting the feedwater 30 into the pressure vessel 12 when required during operation, as is conventionally known. The feedwater 30 is channeled to the vessel 12 through four or more conventional feedwater inlet pipes 32 joined to corresponding feedwater inlet nozzles 34 for channeling the feedwater 30 through the sidewalls of the vessel 12 into the respective spargers 28.

Figure 2:
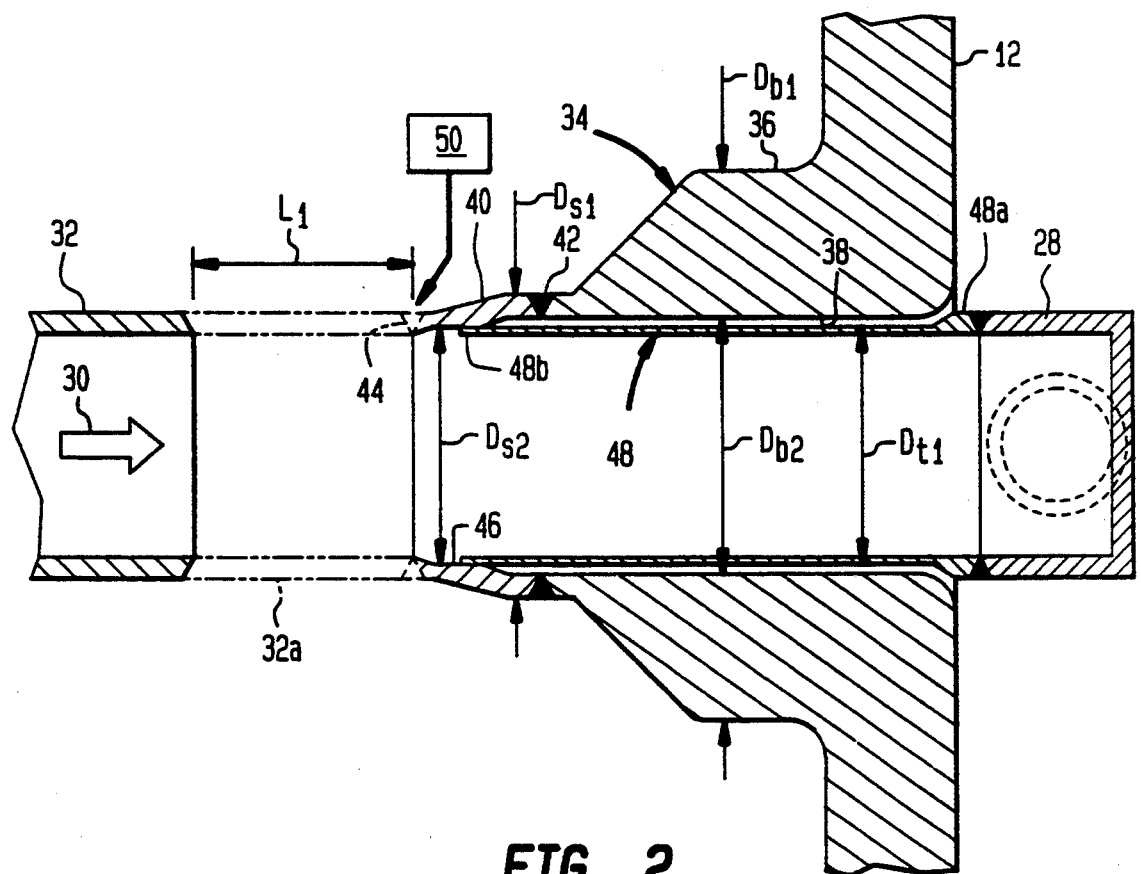
FIG. 2 is an elevation, partly sectional and schematic representation of an exemplary one of the feedwater nozzles illustrated in FIG. 1 during the initial stage of the repair method wherein a portion of the feedwater inlet pipe is removed.

Illustrated in more detail in FIG. 2, is an exemplary one of the feedwater nozzles 34 joined to the inlet pipe 32 and the sparger 28 for channeling the feedwater 30 thereto. The nozzle 34 includes a conventional annular nozzle barrel 36 which is integrally joined with the vessel 12 and forms a part thereof, with the nozzle 34 extending radially outwardly from the vertical, centerline axis of the vessel 12 in this exemplary embodiment. The barrel 36 has a maximum outer diameter $D_{b1}$ and a central first bore 38 extending therethrough and having an inner diameter $D_{b2}$. Since the barrel 36 is integral to the vessel 12, it is formed of the same relatively low alloy steel as the pressure vessel 12 itself. The maximum diameter $D_{b1}$ of the barrel 36 is conventionally selected for accommodating design loads transmitted between the inlet pipe 32 and the vessel 12 and conventionally decreases in diameter at its distal end.

A tubular transition piece or coupling conventionally known as a safe end 40 is joined at a proximal end thereof to the distal end of the barrel 36 by a first weld 42, and is also joined at a distal end thereof to a proximal end of the feedwater inlet pipe 32 at a second weld 44 shown in phantom. The safe end 40 has a maximum outer diameter $D_{s1}$ at its juncture with the barrel 36 which is less than the maximum outer diameter $D_{b1}$ thereof, and similarly includes a complementary central second bore 46 disposed in flow communication with the inlet pipe 32.

A tubular first thermal sleeve 48 is disposed concentrically inside the first bore 38 and has an outer diameter $D_{t1}$ therein which is suitably less than the inner diameter $D_{b2}$ of the first bore 38. The first thermal sleeve 38 has a proximal end 48a extending into the vessel 12 and conventionally joined at a weld to the sparger 28 in flow communication therewith. The first thermal sleeve 48 also includes a distal end 48b disposed in a conventional interference fit with the second bore 46, with the second bore 46 having an inner diameter $D_{s2}$ at this juncture which is suitably less than the inner diameter $D_{b2}$ of the first bore 38.

The original nozzle 34 described above is therefore effective for channeling the feedwater 30 from the inlet pipe 32 and through the safe end 40 and the first thermal sleeve 48 directly into the sparger 28. The interference fit of the distal end 48b of the first thermal sleeve 48 with the safe end 40 provides an effective seal for preventing leakage of the feedwater 30 in the annulus between the first bore 38 and the first thermal sleeve 48. Since the feedwater 30 is relatively cold compared to the relatively high temperature of the nozzle barrel 36, preventing such leakage is required to prevent thermal fatigue which would result if the barrel 36 were to be cooled by the feedwater 30.

However, either upon initial testing of the interference fit seal prior to commercial operation of the BWR 10, or after extended commercial operation of the BWR 10, leakage at the interference fit between the first thermal sleeve 48 and the safe end 40 may be uncovered. As described above, at least two conventional methods of repair are known to reduce or eliminate such leakage, both requiring an appropriate amount of time to effect at substantial effort and cost.

Accordingly, in accordance with one embodiment of the present invention, a repair method is effective for reducing or eliminating leakage between the first and second bores 38 and 46 at the interference fit between the first thermal sleeve 48 with the safe end 40 with a reduction in time, effort, and cost.

More specifically, the improved repair method includes keeping the original safe end 40, first thermal sleeve 48, and sparger 28, thusly preventing the added time, effort, and cost for replacing these items as previously required. Instead, the method further includes removing an end portion 32a of the inlet pipe 32 as illustrated in phantom in FIG. 2, with the portion 32a having a predetermined length $L_1$. The end portion 32a may be conventionally removed by a conventional apparatus 50, shown schematically, by cutting the end portion 32a from the inlet pipe 32 and at the second weld 44 at the safe end 40. The removing apparatus 50 is preferably a conventional guillotine saw, or alternatively may be a suitable cutting wheel or other type of apparatus effective for removing the end portion 32a and the second weld 44.

Figure 3:
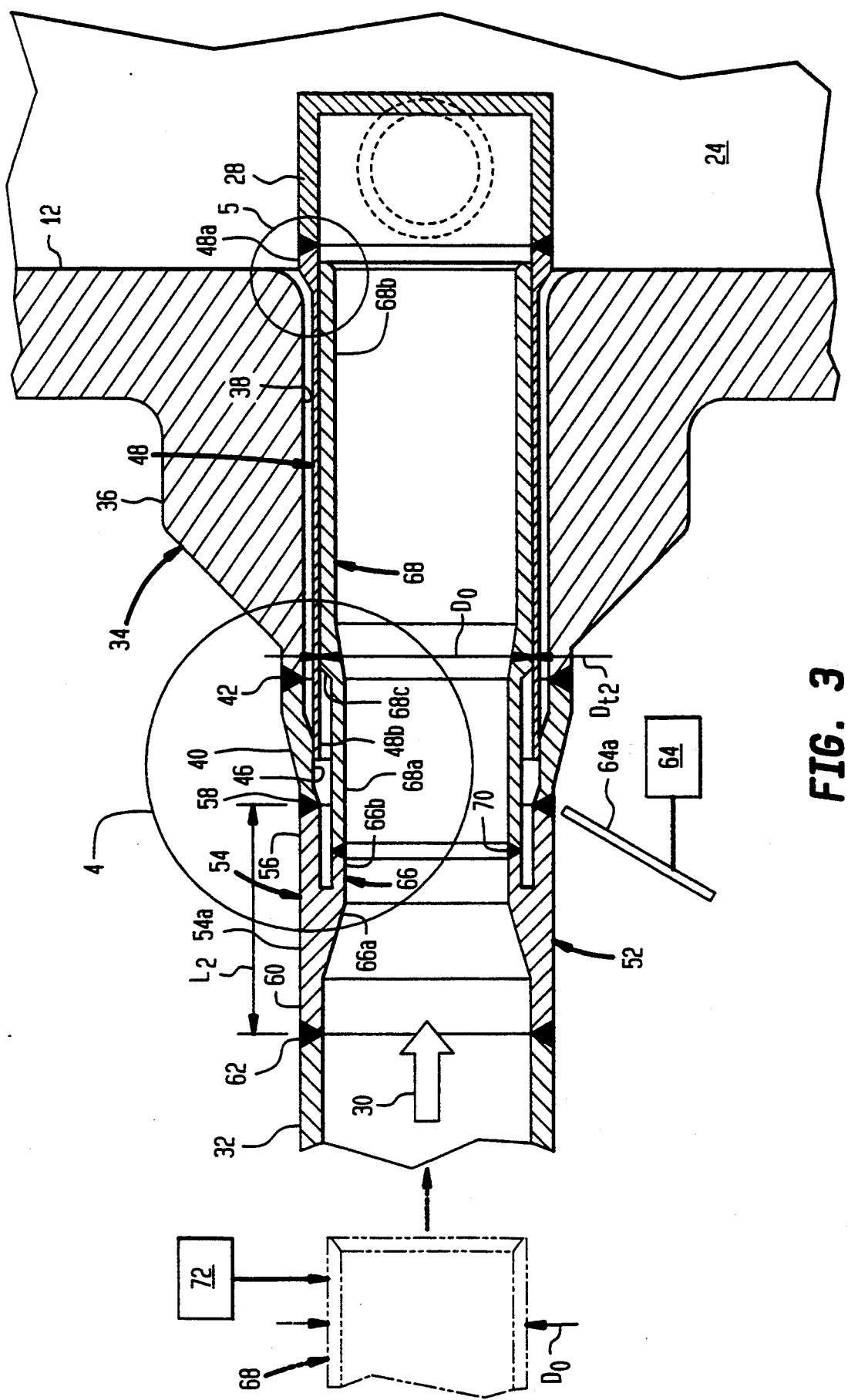
FIG. 3 is an elevation, partly sectional and schematic representation of the feedwater nozzle illustrated in FIG. 2 showing additional steps of the repair process and the resulting repaired feedwater inlet nozzle.

The next step is illustrated schematically in FIG. 3 which includes installing a replacement extension 52 for the removed portion 32a (of FIG. 2) between the inlet pipe 32 and the original safe end 40. In the preferred embodiment illustrated in FIG. 3, the extension 52 is in the form of a conventional tuning fork-type double cylinder including a tubular body 54 having an integral cylindrical first fork 56 at a proximal end thereof fixedly and sealingly joined to the distal end of the safe end 40 by a replacement weld 58. The body 54 also includes a distal end 60 sealingly and fixedly joined to the inlet pipe 32 at a new, third weld 62. As shown schematically in FIG. 3, a conventional welder 64 with an electrode 64a of suitable form is provided to conventionally weld the body 54 to the safe end 40 to form the replacement weld 58, and to the inlet pipe 32 to form the third weld 62.

The extension 52 further includes a cylindrical second fork 66 in the form of a support ring disposed concentrically inside the body 54, and includes a proximal end 66a joined integrally with an intermediate portion 54a of the body 54 between the first fork 56 and the distal end 60 thereof. The second fork 66 includes a distal end 66b spaced inwardly from (in the vertical direction) and extending radially inwardly toward the safe end 40 relative to the longitudinal centerline axis of the vessel 12.

The repaired nozzle 34 also includes a tubular second thermal sleeve 68 disposed concentrically inside the first thermal sleeve 48. Thermal sleeve has a proximal end 68a sealingly and fixedly joined to the distal end 66b of the second fork 66 at a suitable weld 70. The replacement extension 52 is preferably an integral assembly of the body 54 and the second thermal sleeve 68 prewelded thereto at the second weld 70 before assembly to the repaired nozzle 34. The second thermal sleeve 68 also includes a distal end portion 68b disposed in sealing cooperation with the inner surface of the first thermal sleeve 48 for sealing flow therebetween to the interference fit between the first thermal sleeve 48 and the safe end 40. In this way, the second thermal sleeve 68 is joined to the extension 54 and provides an effective seal between it and the first thermal sleeve 48 for channeling the feedwater 30 from the inlet pipe 32 and in turn through the second fork 66 and the second thermal sleeve 68 into the sparger 28. The seal formed between the distal end portion 68b of the second thermal sleeve 68 and the inner surface of the first thermal sleeve 48 prevents backflow of the feedwater 30 therebetween from reaching the interference fit at the distal end 48b of the first thermal sleeve 48, and thereby reducing or eliminating leakage of the feedwater therethrough. Accordingly, the second thermal sleeve 68 provides yet another barrier for thermally isolating the nozzle barrel 36 from the relatively cold feedwater 30 for improving thermal fatigue life thereof.

In the preferred embodiment of the invention illustrated in FIG. 3, the removing and installing steps are preferably performed from outside the pressure vessel 12 instead of inside thereof in the downcomer 24, which reduces the radiation exposure to the maintenance personnel effecting the repair. Once the end portion 32a of the inlet pipe 32 is removed as illustrated in FIG. 2, the remaining feedwater inlet pipe 32 may be conventionally removed for allowing inserting of the second thermal sleeve 68 integrally carried with the replacement extension 52 through the open safe end 40 and radially inwardly relative to the centerline of the vessel 12 into the first thermal sleeve 48. The body 54 has a length $L_2$ which is preferably equal to the length $L_1$ of the removed inlet pipe end portion 32a so that when the welds 58, 62 are made, the inlet pipe 32 is returned to its original position.

In the preferred embodiment of the present invention, an intermediate portion 68c of the second thermal sleeve 68 is preferably placed in an interference fit inside the first thermal sleeve 48, which is accomplished by firstly cooling the second thermal sleeve 68 for its contraction. As illustrated in FIG. 3, the second thermal sleeve 68 has a maximum outer diameter $D_o$ at the intermediate portion 68c between the proximal and distal ends 68a, 68b which is predeterminedly selected relative to the inner diameter $D_{i2}$ of the first thermal sleeve 48 so that upon suitable cooling thereof, the intermediate portion 68c will contract sufficiently for allowing it to be inserted into the first thermal sleeve 48 without significant restraint therefrom. As illustrated schematically in FIG. 3, a conventional cooling apparatus 72, which may simply include liquid nitrogen, is provided for bathing the second thermal sleeve 68 to reduce its temperature and thereby reduce its outer diameter $D_o$. The second thermal sleeve 68 is then radially (horizontally) inserted into the first thermal sleeve 48 as illustrated in phantom in FIG. 3, and then the method includes allowing the second thermal sleeve 68 to warm and expand for forming the interference fit between the intermediate portion 68c thereof and the first thermal sleeve 48.

At the same time, the first fork 56 is disposed adjacent to the safe end 40 so that the welder 64 may form the replacement weld 58 for fixedly and sealingly joining the first fork 56 to the safe end 40. Since the first fork 56 is welded to the original safe end 40, and not to the low alloy nozzle barrel 46, the method is also characterized by the absence of a post-weld heat treatment step of the safe end 40. The original safe end 40 is formed of a conventional material which does not require post-weld heat treatment.

Figure 4:
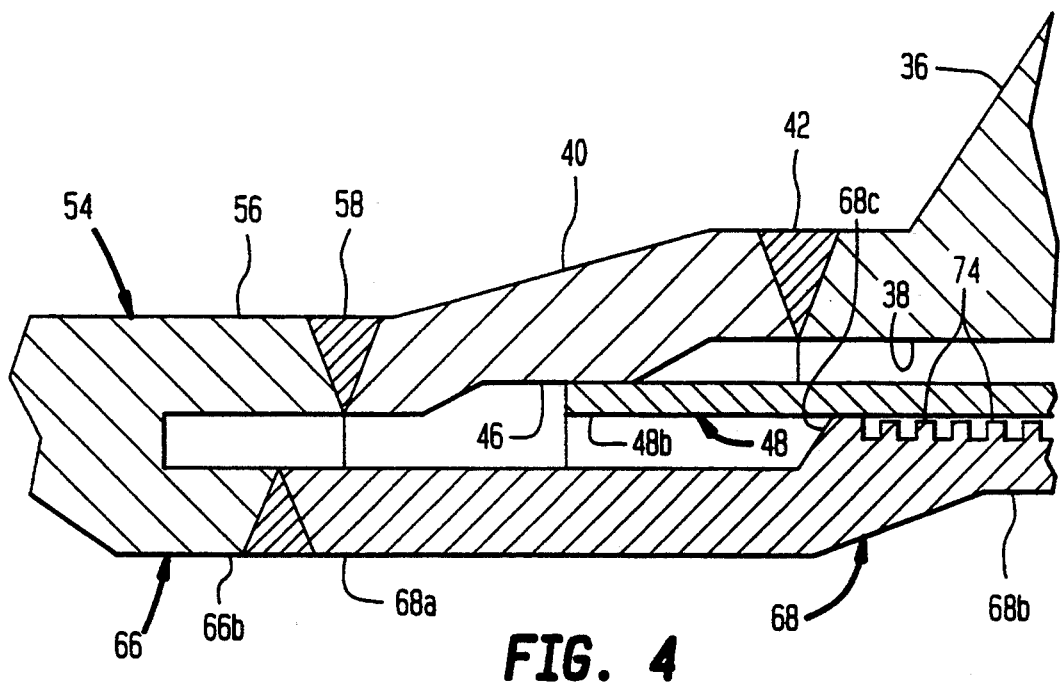
FIG. 4 is a blowup of a region of the feedwater inlet nozzle illustrated within the circle labeled 4 in FIG. 3.
Figure 5:
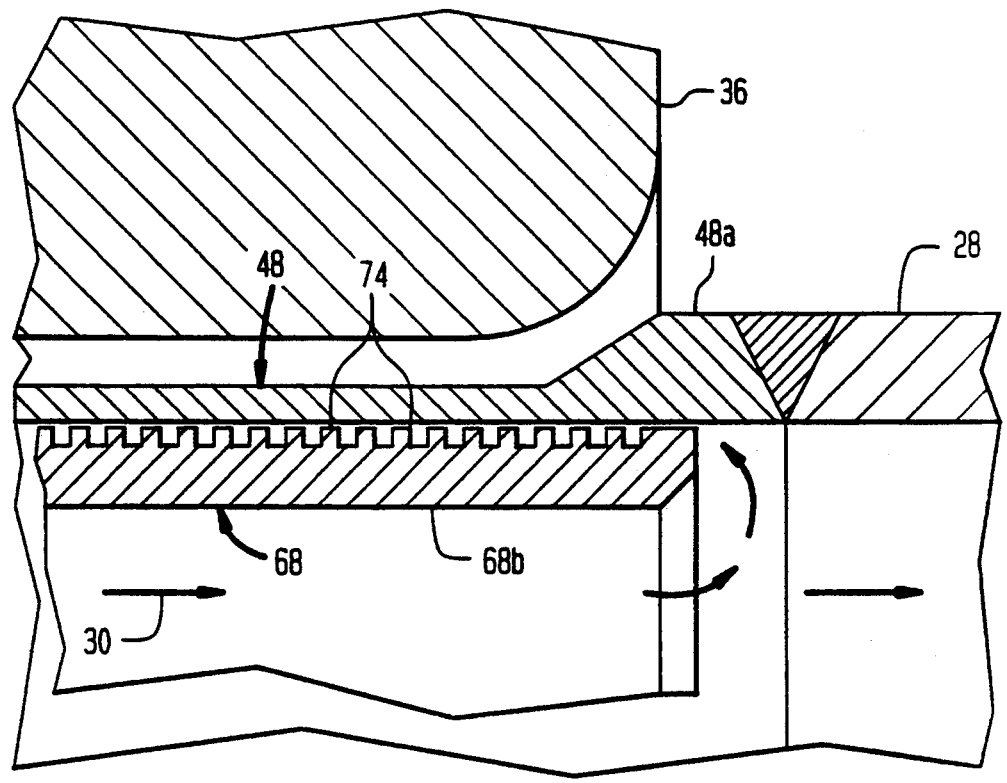
FIG. 5 is a blowup of a portion of the feedwater inlet nozzle within the circle labeled 5 in FIG. 3.

FIG. 4 illustrates in more particularity the juncture of the first fork 56 with the safe end 40 at the replacement weld 58. The interference fit between the distal end 48b of the first thermal sleeve 48 and the second bore 46 is also shown. Although the second thermal sleeve 68 may have a suitably smooth outer surface joined in the interference fit with the inner surface of the first thermal sleeve 48 for reducing or preventing leakage therebetween, in the preferred embodiment illustrated in FIGS. 4 and 5, the distal end portion 68b of the second thermal sleeve 68 preferably includes a plurality of longitudinally spaced apart labyrinth seal teeth 74 extending circumferentially around the outer surface thereof and disposed adjacent to the inner surface of the first thermal sleeve 48 for forming a small clearance therewith and a labyrinth-type fluid seal. In alternate embodiments, suitable piston rings could also be used between the first and second thermal sleeves 48, 68 for providing sealing therebetween if desired. In this way, the first thermal sleeve 48 is allowed to expand and contract, and therefore slide, relative to the second bore 46 as temperatures change during operation of the reactor 10, and similarly, the second thermal sleeve 68 is also allowed to expand and contract, and therefore slide relative to the first thermal sleeve 48 as temperatures vary during operation of the reactor 10.

Accordingly, the repair method described above may be effected at a considerable cost savings from the conventional repair methods, and the resulting improved feedwater inlet nozzle 34 including the replacement extension 52 and the second thermal sleeve 68 provides increased thermal protection of the nozzle barrel 36 during operation.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A method of repairing a nozzle of a vessel comprising:

a nozzle barrel integral with said vessel and having a first bore;

a tubular safe end joined at a proximal end to a distal end of said barrel by a first weld, and joined at a distal end to a proximal end of an inlet pipe at a second weld, said safe end having a second bore disposed in flow communication with said inlet pipe; and a first thermal sleeve disposed inside said first bore, and having a proximal end extending into said vessel, and having a distal end disposed in an interference fit with said second bore;

said repair method being effective for reducing leakage between said first and second bores at said interference fit of said first thermal sleeve with said safe end and comprising the steps of:

removing an end portion of said inlet pipe and said second weld at said safe end; and installing a replacement extension for said removed portion between said inlet pipe and said safe end, said extension comprising:

a tubular body having a first fork at a proximal end joined to said safe end distal end by a replacement weld, and having a distal end joined to said inlet pipe at a third weld;

a second fork disposed concentrically inside said first fork and having a proximal end joined integrally with an intermediate portion of said tubular body, and having a distal end extending away from said inlet pipe; and a second thermal sleeve disposed inside said first thermal sleeve, and having a proximal end joined to said second fork distal end, and having a distal end portion disposed in sealing cooperation with said first thermal sleeve for sealing flow therebetween to said interference fit between said first thermal sleeve and said safe end.

2. A method according to claim 1 wherein said removing and installing steps are performed from outside said vessel, and further comprising the step of inserting said second thermal sleeve through said safe end and into said first thermal sleeve.

3. A method according to claim 2 further comprising firstly cooling said second thermal sleeve to contract said second thermal sleeve for allowing said second thermal sleeve to be inserted into said first thermal sleeve, and then allowing said second thermal sleeve to warm and expand for forming an interference fit between an intermediate portion thereof and said first thermal sleeve.

4. A method according to claim 3 wherein said replacement extension is installed by welding said first fork to said safe end to form said replacement weld without post-weld heat treatment of said safe end.

5. A method according to claim 4 wherein:

said vessel is a pressure vessel containing a nuclear reactor core submerged in water; and said nozzle is a feedwater nozzle and said fluid is feedwater channeled from said inlet pipe therethrough; and further including a feedwater sparger disposed in flow communication with said first thermal sleeve for receiving said feedwater therefrom for injection into said pressure vessel above said core.

6. A feedwater inlet nozzle of a pressure vessel containing a nuclear reactor core submerged in water, said nozzle being joined at one end to a feedwater inlet pipe and at an opposite end to a feedwater sparger for channeling feedwater into said vessel, comprising:

a nozzle barrel integral with said vessel and having a first bore;

a tubular safe end joined at a proximal end to a distal end of said barrel by a first weld, and having a second bore disposed in flow communication with said inlet pipe;

a first thermal sleeve disposed inside said first bore, and having a proximal end extending into said vessel, and having a distal end disposed in an interference fit with said second bore; and an extension disposed between said inlet pipe and said safe end, said extension comprising:

a tubular body having a first fork at a proximal end joined to said safe end distal end by a second weld, and having a distal end joined to said inlet pipe at a third weld;

a second fork disposed concentrically inside said first fork and having a proximal end joined integrally with an intermediate portion of said tubular body, and having a distal end extending away from said inlet pipe; and a second thermal sleeve disposed inside said first thermal sleeve, and having a proximal end joined to said second fork distal end, and having a distal end portion disposed in sealing cooperation with said first thermal sleeve for sealing flow therebetween to said interference fit between said first thermal sleeve and said safe end.

7. A nozzle according to claim 6 wherein said distal end portion of said second thermal sleeve includes a plurality of longitudinally spaced apart labyrinth seal teeth extending circumferentially around an outer surface thereof, and disposed adjacent to said first thermal sleeve for forming a fluid seal therewith.

8. A nozzle according to claim 7 wherein said second thermal sleeve further includes an intermediate portion disposed between said proximal and distal ends thereof in an interference fit with said first thermal sleeve.

* * * * *